(12) United States Patent
Van Parys

(10) Patent No.: US 8,787,325 B2
(45) Date of Patent: Jul. 22, 2014

(54) SCHEDULING BEST EFFORT TRAFFIC WITH GUARANTEED LATENCY TRAFFIC IN A COMMUNICATIONS SYSTEM HAVING A BLUETOOTH-LIKE PACKET COMMUNICATION PROTOCOL

(71) Applicant: ST-Ericsson SA, Plan-les-Ouates (CH)

(72) Inventor: Jorgen Van Parys, Oostakker (BE)

(73) Assignee: ST-Ericsson SA, Plan-les-Ouates (CH)

( * ) Notice: Subject to any disclaimer, the term of this patent is extended or adjusted under 35 U.S.C. 154(b) by 132 days.

(21) Appl. No.: 13/622,762

(22) Filed: Sep. 19, 2012

(65) Prior Publication Data

US 2014/0079030 A1 Mar. 20, 2014

(51) Int. Cl.
*H04J 3/00* (2006.01)
*H04W 4/00* (2009.01)
*H04L 12/26* (2006.01)

(52) U.S. Cl.
USPC ........... 370/336; 370/328; 370/252; 370/329; 455/509

(58) Field of Classification Search
CPC ....... H04L 47/12; H04L 47/18; H04L 1/1809; H04L 41/14; H04L 47/125; H04L 47/22; H04L 47/2416; H04W 4/26; H04W 24/02; H04W 28/0268; H04W 28/10; H04W 72/04; H04W 72/0406; H04W 72/0446; H04W 72/08; H04W 72/12; H04W 84/20; H04W 92/18
USPC ........... 370/328, 329, 330, 252, 336; 455/509
See application file for complete search history.

(56) References Cited

U.S. PATENT DOCUMENTS

| | | | | |
|---|---|---|---|---|
| 2007/0153690 | A1* | 7/2007 | Stanwood et al. | 370/230 |
| 2008/0101231 | A1* | 5/2008 | Lai et al. | 370/235 |
| 2009/0219879 | A1* | 9/2009 | Zimmerman et al. | 370/329 |
| 2009/0219912 | A1* | 9/2009 | Wengerter et al. | 370/345 |
| 2011/0013513 | A1* | 1/2011 | Lai et al. | 370/235 |
| 2012/0269143 | A1* | 10/2012 | Bertrand et al. | 370/329 |

FOREIGN PATENT DOCUMENTS

EP 1758312 A1 * 2/2007

OTHER PUBLICATIONS

Liu et al., A simple adaptive MAC scheduling scheme for Bluetooth scatternet, Vehicular Technology Conference, 2003. VTC Fall 2003. 2003 IEEE 58th (vol. 4 ), IEEE, Oct. 6-9, 2003.*

(Continued)

*Primary Examiner* — Benjamin H Elliott, IV
*Assistant Examiner* — Eric Nowlin
(74) *Attorney, Agent, or Firm* — Leffler Intellectual Property Law, PLLC; Kenneth B. Leffler

(57) ABSTRACT

Time frames (TFs) are allocated for performance of transactions of a low latency data stream (LLDS) and a best effort data stream (BEDS) in Bluetooth®-like equipment, wherein payload carrying packets of the different data streams are equal in size, each occupying multiple TFs. An overrule mechanism enables uncompleted transactions of one data stream to continue as needed into TFs allocated to another data stream. Every TF within an allocation window (AW) is individually allocated to the LLDS or the BEDS, and plural TFs immediately following the AW form a guard space between adjacent AWs, the guard space being allocated to neither the LLDDS or the BEDS. Configuration of the AW and of the guard space guarantees the LLDS a first opportunity to transmit a payload carrying packet and continued opportunities to retransmit the packet until successful, after which the BEDS is given an opportunity for transmission and possible retransmissions.

13 Claims, 10 Drawing Sheets

(56) References Cited

OTHER PUBLICATIONS

Yaiz, R. A. et al. "Providing QoS in Bluetooth" Cluster Computing 8, 223-231, 2005 Springer Science + Business Media, Inc., The Netherlands.

Misic, V. B. et al. "Load and QoS-Adaptive Scheduling in Bluetooth Piconets" Proceedings of the 37th Hawaii International Conference on System Sciences Jan. 5-8, 2004, pp. 294-301, IEEE, 2004, 0-7695-2045-1/04.

Famolari, D. et al. "Improving Simultaneous Voice and Data Performance in Bluetooth Systems" IEEE 2002 Global Telecommunications Conference, Nov. 17-21, 2002, vol. 2, pp. 1810-1814, 0-7803-7632-3.

Das, A. et al. "Enhancing Performance of Asynchronous Data Traffic over the Bluetooth Wireless Ad-hoc Network" IEEE Infocom 2001, pp. 591-600, 0-7803-7016-3/01.

Joo, Yang-Ick et al. "Differentiated Scheduling for Bluetooth QoS with Parameter Optimization" IEICE Trans. Commun., vol. E88-B, No. 1, Jan. 2005, The Institute of Electronics, Information and Communication Engineers, pp. 274-280, 2005.

Choi, S. J. et al. "An Enhanced Bluetooth MAC Protocol for Wireless Sensor Network Application" IEEE 59th Vehicular Technology Conference, May 17-19, 2004, vol. 3, pp. 1345-1349, 0-7803-8255-2/04.

Liu, Y. et al. "A Priority-Based MAC Scheduling Algorithm for Enhancing QoS Support in Bluetooth Piconet" IEEE 2002 International Conference on Communications, Circuits and Systems and West Sino Expositions, Jun. 29-Jul. 1, 2002, vol. 1, pp. 544-548, 0-7803-7547-5/02.

PCT International Search Report, mailed Dec. 13, 2013, in connection with International Application No. PCT/EP2013/067810, all pages.

PCT Written Opinion, mailed Dec. 13, 2013, in connection with International Application No. PCT/EP2013/067810, all pages.

Jonsson, Bjorn "Bluetooth QoS Scheduler" Jan. 28, 2003, XP055089117, retrieved from the Internet: URL:http://kth.diva-portal.org/smash/get/diva2:515043/FULLTEXT01.pdf [retrieved on Nov. 11, 2013], sections 1, 3.3, 4, 5.1, 6.1, 7.

Chang, Younseog et al. "An enhanced throughput and QoS-aware scheduling polllicy for bluetooth" Wireless Communications and Networking Conference, 2004, IEEE Atlanta, GA, USA, Mar. 21-25, 2004, Piscataway, NJ, USA, IEEE, vol. 2, Mar. 21, 2004, pp. 1004-1007, XP010708427, DOI: 10.1109/WCNC.2004.1311324, ISBN: 978-0-7803-8344-9 sections II and III.

Hsu, Ching-Fang et al. "An Adaptive Traffic-Aware Polling and Scheduling Algorithm for Bluetooth Piconets", IEEE Transactions on Vehicular Technology, IEEE Service Center, Piscataway, NJ, US, vol. 59, No. 3, Mar. 3, 2010, pp. 1402-1414, XP011298399, ISSN: 0018-9545, section III.

\* cited by examiner

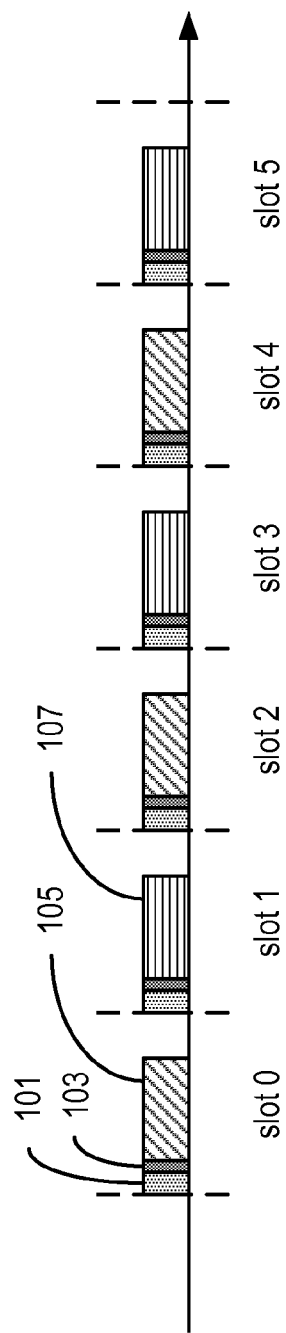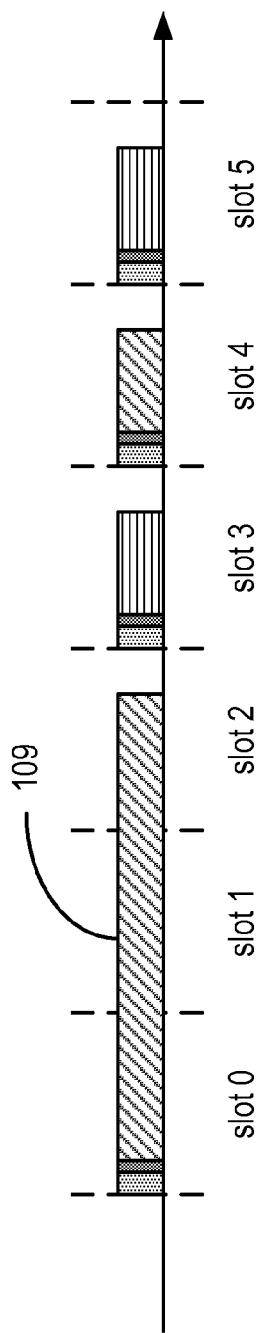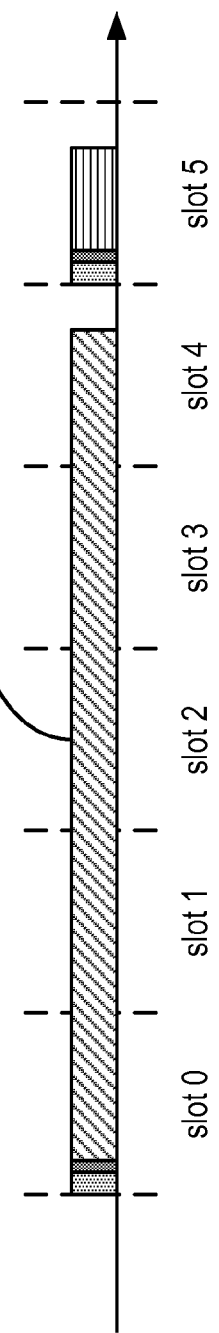

SCHEDULING BEST EFFORT TRAFFIC WITH GUARANTEED LATENCY TRAFFIC IN A COMMUNICATIONS SYSTEM HAVING A BLUETOOTH-LIKE PACKET COMMUNICATION PROTOCOL

BACKGROUND

The invention relates to data packet scheduling in a communications system, and more particularly to efficient scheduling of best effort traffic with guaranteed latency traffic.

Many communications systems permit a data stream ("traffic") to be associated with one of a number of quality of service levels, which define respective amounts of effort that the system will make with respect to the speed and accuracy of data transmission. One type of quality of service is called "best effort." Best effort data streams, such as file-transfers or object-push (e.g., sending a business card, a photograph, etc.) do not require a guaranteed bandwidth or latency. Instead, bandwidth is permitted to vary in the course of the communication/transaction and data delivery latency is not of concern. The data transfer may even stall (temporarily) in favor of other activities.

Another type of quality of service is called "guaranteed (low) latency." In contrast to best effort service, guaranteed (low) latency service is typically used for carrying an audio stream over a wireless (e.g., Bluetooth®) link while a video stream is simultaneously displayed. The audio stream must stay synchronized and be rendered with, at most, a small delay (typically less than 50 msec) relative to the rendering of the video stream.

When handling a guaranteed latency stream, the sending device guarantees a maximum amount of time in which a given (fixed) amount of data will be delivered (or discarded in case the transmission failed). Typically, these data transfers are repeated periodically, thus providing a constant bandwidth with a guaranteed maximum latency.

It is often the case that a same sending device will be responsible for several independent data streams at the same time, and these need not be associated with the same quality of service. When these independent data streams are to be time-wise multiplexed (i.e., meaning that they are not to be transmitted in parallel but instead are to take turns with transmissions), the sending device must utilize some sort of scheduling algorithm that will dictate which data stream's packets will be transmitted at any given time.

Scheduling algorithms must take into account the particular characteristics of the transmission protocol to be used. (A communication protocol is a set of rules that govern how data will be communicated from a sender to a receiver.) Here, communications equipment conforming to any of the standardized Bluetooth® protocols serves as a useful example. The Bluetooth® wireless interface, introduced by the Bluetooth Special Interest Group (Ericsson, Nokia, IBM, Toshiba and Intel) in 1998, is designed to be a low-cost, low-power and short-range cable replacement. A complete description of a Bluetooth® interface is far beyond the scope of this description. However, of relevance to the present discussion is how Bluetooth® provides for separate data streams to be communicated by a common sender.

Communication in a Bluetooth® system is packet-based, and links between Bluetooth® equipment are established on an ad hoc basis. In order to provide a mechanism for controlling the link, one of the units in the link is denoted as a master, and the other is denoted a slave. To enable more than one device to be linked together, one master may communicate with up to seven slaves in what is called a "piconet." Packet exchange is based on the basic clock of the master, and all slaves are aware of any existing offset between the master's clock and their own so that they are able to know, at any time, what the master's clock would read. The air interface is time-wise divided up into sequentially occurring "slots" that progress in accordance with the "ticking" of the master's clock.

Further in accordance with Bluetooth® standards, transmission opportunities always take place in pairs, with a master transmitting first to one of the slaves (the master's transmissions include a slave address so that a slave can ascertain that it is the intended recipient of a transmission) followed by the slave having an opportunity to transmit back to the master. The master may operate in round-robin fashion, giving different slaves the opportunity to receive and then transmit a packet.

In the simplest case, a packet is sized so that it will exactly fit within the payload portion of one slot. (Header information is also communicated with the payload, whereby additional information such as the address of the intended recipient as well as acknowledgement information can also be transmitted.) When a 1-slot packet size is chosen, first the master is given an opportunity to transmit a packet to a slave in an even slot and this is immediately followed by that same slave being given an opportunity to transmit a packet back to the master in the next odd slot. An even slot and its immediately following odd slot are, when taken together, called a "slot pair."

The Bluetooth® standards permit a variety of packet sizes to be used. In particular, packets may be 1, 3, or 5 slots long. (In practice, so-called "inter-packet guard spaces" are left between adjacent packets so that no one packet occupies the entirety of its allotted slot space.) Regardless of selected packet size, however, the master always begins its transmissions on an even slot, and slaves always begin their transmissions on an odd slot. This arrangement is illustrated in FIGS. 1a, 1b, and 1c. FIG. 1a illustrates a case involving only 1-slot packets. However, some aspects of the illustrated packets are the same regardless of packet size. For example, every packet includes an access code 101 (depicted in all instances by light gray shading) regardless of the packet's direction (master-to-slave or slave-to-master) or length. An access code 101 is used for synchronization, DC offset compensation and identification. Among other things, it is the mechanism by which a piconet can identify itself, and by which a page can be directed to a particular Bluetooth® device.

Every packet, regardless of direction or length also includes a header 103 (depicted in all instances by dark gray shading). The header 103, which is used for link control, includes a number of fields including a field that the sending device can encode to indicate either acknowledgement ("ACK") or negative acknowledgement ("NACK") of a last-received packet. In this respect, it is useful to note that the Bluetooth® protocol includes rules that call for the receiver of a packet to indicate ACK/NACK in its very next transmission opportunity. When a receiver signals "NACK" back to the sender of a packet, the sender can then decide whether to retransmit that same packet to the receiver rather than a new packet during its next transmission opportunity.

Packets also include payload portions. Unlike the access code and header portions 101, 103, the payload portion can be of varying length. FIG. 1a depicts examples in which all payloads are sized such that the entire packet length fits within one slot (so-called "1-slot packets"). Merely for purposes of illustration, six slots are illustrated, numbered consecutively "0" through "5". As mentioned earlier, all master-to-slave packets are transmitted in even-numbered slots, and these are depicted throughout the figures by means of diagonal hatching in their payload portions. All slave-to-master packets are transmitted in odd-numbered slots, and these are depicted through the figures by means of horizontal hatching in their payload portions. (It will be understood that, in all instances, the accompanying access codes and headers of these payloads also travel in the same direction as their payloads.)

Accordingly, a first 1-slot packet having a payload 105 is communicated in slot 0. The next occurring slot (slot 1) is an odd-numbered slot, and therefore is used for communication of a 1-slot packet from slave-to-master. Slots 2 through 5 repeat this pattern, with even numbered slots being used for transmission of master-to-slave 1-slot packets, and odd numbered slots being used for transmission of slave-to-master packets.

FIG. 1b depicts an instance in which the master transmits a 3-slot packet starting in slot 0. It will be observed that the payload 109 of this packet extends from slot 0, through the entirety of slot 1, and into slot 2. Slot 3 is odd-numbered and therefore used for a slave-to-master packet transmission, and the same is true of slot 5. Slot 4 is even numbered, and in this instance illustrates a master's transmission of a 1-slot packet to the slave.

FIG. 1c depicts an instance in which the master transmits a 5-slot packet starting in slot 0. It will be observed that the payload 111 of this packet extends from slot 0, through the entireties of slots 1 through 2, and then into slot 4. The very next slot, slot 5, is odd-numbered and is therefore used for a slave-to-master packet transmission.

The term "transaction" is used herein to refer to the combined occurrence of a master-to-slave packet transmission (in an even-numbered slot) followed by the next-occurring slave-to-master packet transmission (in an odd-numbered slot). A so-called "frame" consists of two time-wise adjacent slots in which a transaction occurs (also called a "slot-pair"). The use of even/odd slot numbering to control the direction in which packets are communicated does not carry with it any implications regarding to what data stream packet transmissions belong except that the packets communicated in any given transaction (i.e., from master-to-slave followed by from slave-to-master) are both associated with a same data stream.

As used herein, the term "Bluetooth®-like" is used to indicate that the problems and solutions described herein are applicable not only to genuine Bluetooth® equipment, but more broadly to any communications equipment whose protocol follows a master/slave, odd/even slot, protocol such as was described above.

When independent data streams are to be time-wise multiplexed in accordance with a Bluetooth®-like protocol, the sending device must utilize some sort of scheduling algorithm that will dictate in which slots each data stream's transactions packets will begin. It is therefore useful to employ a prescheduling architecture, which is a scheduling architecture that pre-calculates/pre-schedules the different air activities some time in advance of the expected occurrence of those activities. Embodiments can be implemented in which pre-scheduling is separated from data path activities. This means that prescheduled frames of air-time may or may not actually be used for the allocated data transfers. The decision whether to actually use a given slot/frame for its pre-scheduled purpose can be made by, for example, a baseband controller that only operates in the prescheduled frames of air-time for that link.

Some embodiments that utilize a prescheduling architecture also employ an "overrule mechanism", by which prescheduled activities for one link (e.g., planned transactions associated with data stream "A") may be overruled by other activities that started in an earlier frame of air-time that was scheduled for another link (e.g., data stream "B"). Overruling a prescheduled activity only occurs if the preceding activity has not finished when the baseband controller is supposed to load the subsequent prescheduled frame. An activity's failure to finish when expected can occur, for example, if the amount of scheduled time is insufficient for the actual activity performed (e.g., if 1 or 2 frames are reserved for a data stream, but in actuality transmission of a 5-slot packet, which requires 3 frames, is started at the beginning of the first frame). A frame whose prescheduling is overruled is neither used for its prescheduled purpose, nor is this lost use compensated for in any way later on by, for example, allowing the overruled data stream to "steal back" a frame from the data stream that caused the overruling. Instead, the planned activity of the overruled data stream is effectively skipped by the baseband controller. This results in the overruled data stream's activities being delayed by some amount.

The scheduling of traffic with a low latency service type is usually prioritized over the scheduling of other traffic types and is very predictable with respect to data availability (from the source of the traffic). Intrinsically, low latency data streams have a high scheduling periodicity (i.e., short inter-packet timing) and often a relatively high duty cycle. This effectively leaves only limited time for the transmission of other traffic types. The problem is aggravated by the fact that a sender may need to retransmit any packet that is not acknowledged as having been successfully received at the target destination. Such retransmissions take up even more of the limited time that would otherwise be available for the transmission of other traffic types.

On the other hand, data availability of best effort data is not always predictable, making it more difficult for scheduling algorithms to mix best effort traffic with that having a guaranteed low latency service type. Transmissions for best effort traffic need to be fit efficiently into the limited air-time left over by the low latency data stream, maximizing the (re) transmission opportunities for best effort but also avoiding a pre-emption/overruling of subsequent transmissions of the low latency data stream. Otherwise, latency of the guaranteed traffic would not be guaranteed.

A timing diagram of a conventional prescheduling strategy for mixing low latency traffic with best effort traffic is depicted in FIG. 2a. Dotted lines are used here and in subsequent timing diagrams to illustrate the prescheduling of time frames, whereas solid lines are used here and in subsequent timing diagrams to denote the actual occurrence of a transaction. The conventional prescheduling strategy is characterized by the use of guard frames, such as the guard frames 201, 203 shown in FIG. 2a. A guard frame is a frame that has been deliberately left unallocated for use by any of the data streams. It is used to prevent one data stream's transaction (having a particular quality of service level) that has started in a preallocated time frame and that is continuing into successive time frames (i.e., by means of the "overrule" mechanism described above) from "spilling over" into a time frame that has been preallocated for use by another data stream having a different quality of service. The size of the guard space should be at least large enough to accommodate a remaining ("spillover") part of an expected transaction. In the example of FIG. 2a as well as in all subsequent timing diagrams, crosshatching is used to indicate a low latency quality of service (of which guaranteed latency is one non-limiting example; as used throughout this disclosure including the claims, the term "low latency" should be understood to include but not be limited to guaranteed latency quality of service), and a solid white filling is used to indicate a best effort quality of service. Hence, it can be seen that the four time frames 205 are preallocated for use by a low latency (L.L.) data stream. These are followed by a guard space 201, which in turn is followed by seven time frames 207 that are preallocated for use by a best effort (B.E.) data stream. The seven time frames 207 preallocated for use by the best effort data stream are then followed by another guard space 203. In this example, the illustrated pattern is then repeated.

In this example, it is envisioned that each transaction (for both the low latency and best effort data streams) can occupy as many as three time frames. Hence, a last preallocated time frame for the low latency data stream should be followed by at least two unallocated time frames that serve as guard frames 201 (i.e., the one last preallocated time frame plus the following two unallocated time frames are together large enough to accommodate one transaction requiring three time frames.) Similarly, the last preallocated time frame for the best effort data stream should be followed by at least two unallocated time frames that serve as guard frames 203 for the best effort data stream.

FIG. 2b is a timing diagram illustrating an example in which all transactions complete successfully on the first try, making retransmissions unnecessary. A time frame 209 is preallocated for use by the best effort data stream, so consequently a best effort transaction 211 is started when the preallocated time frame is the current time frame. The transaction 211 is a payload carrying transaction that requires 3 time frames to perform. Consequently, the transaction started in time frame 209 spills over into the next two succeeding time frames. It is noted that the next two time frames following the time frame 209 have also been preallocated for use by the low latency data stream, so that none of the other (best effort) data stream's preallocated time frames have been overruled; however, this "spillover" would have occurred regardless.

Since, in this example, it is assumed that the transaction 211 has been completed successfully, there is no need for retransmission. The very next time frame 213 has also been preallocated for use by the low latency data stream and, thanks to the guard space 201, the baseband scheduler can safely begin another 3-frame transaction starting in the time frame 213. However, in this example it is assumed that there is no further data to transmit at this moment, so the time frame 213 is used only for a transaction 215 that can be completed within one time frame (e.g., polling and communicating an ACK/NAK to the slave). No transactions at all take place during the unallocated time frames of the guard space 201.

Following the first guard space 201, a time frame 217 has been preallocated for use by the best effort data stream. Consequently, a best effort transaction 219 begins when the preallocated time frame 217 is the current time frame, and extends into the next two time frames. The next time frame 221 is also allocated to a best effort data stream, so a three-frame best effort transaction 223 begins when the time frame 221 is the current time frame.

Following the transaction 223, the next time frame 225 is preallocated for use by best effort traffic, so yet another three-frame transaction 227 begins when the time frame 225 is the current time frame and extends into the next two time frames, which in this case is the second guard space 203.

The next preallocated time frame 229 is preallocated for use by low latency traffic, so a three-frame low latency transaction 231 begins when the time frame 229 is the current time frame, and extends into the next two time frames. Since it is assumed in this example that there are no retransmissions, the pattern described above is repeated for successive time frames.

It can be seen that, in the interest of ensuring the possibility of immediately providing an opportunity for a low latency retransmission, the guard spaces 101 are required. It can further be seen that this turns out to be wasted (unused) time when the retransmissions are not required. It would be desirable to make use of this air time for a best effort data stream.

FIG. 2c is an exemplary timing diagram illustrating time frame usage when single retransmissions are required in the low latency data stream. As before, a three-frame low latency transaction 233 begins when the time frame 209 is the current time frame. The transaction extends into the next two time frames, and here it is assumed that, at the conclusion of the transaction, the sender (master) receives acknowledgement information indicating that the packet was not successfully received by the receiver (slave). Consequently, the low latency sender uses its next preallocated time frame 213 to start a retransmission ("retry") of the same transaction 235. This transaction 235 extends through the entirety of the first guard space 201.

The next time frame 217 is allocated for use by the best effort data stream, and as before, three best effort transactions 237, 239, 241 take place before the low latency data stream has another opportunity to start a transaction.

The low latency data stream's next opportunity to start a transaction is during time frame 229. In this example, this transaction 243 is assumed to be a new transaction. In theory, it could alternatively be a second retry of the transaction 233, if this had been needed after the first retry 235. However, in some embodiments the requirement for low- or guaranteed latency may require that no further retries are permitted due to timing requirements (i.e., it may be necessary, in order to satisfy quality of service requirements, to begin the next transaction and to abort the earlier failed transaction).

In this example, it is assumed that the transaction 243 was unsuccessful, so that the transaction is retried 245 beginning in time frame 247. Remaining illustrated transactions are performed in accordance with principles described and illustrated earlier.

FIG. 3a depicts another timing diagram of a conventional prescheduling strategy for mixing low latency traffic with best effort traffic. In this example, the preallocation is arranged to permit the low latency traffic as many as two retries (if needed) in the event of a failed initial transaction. As before, guard spaces 301, 303 are required to ensure, respectively, that the low latency transactions do not overrule the planned start of best effort transactions, and that best effort transactions do not overrule the planned start of low latency transactions. However, in order to ensure that the low latency data stream has two retry possibilities after each initial transaction, 7 successive (i.e., contiguous) time frames 305 are preallocated for use by the low latency data stream in each instance. In order to satisfy the low latency data stream's quality of service requirements, initial transaction opportunities cannot be spaced too far apart. Accordingly, in this example, time frames 307 preallocated for use by the best effort data stream have been reduced in number down to four successive time frames.

FIG. 3b is a timing diagram illustrating an example in which all transactions complete successfully on the first try, making retransmissions unnecessary. A time frame 309 has been preallocated for use by the low latency data stream, so when the time frame 309 is the current time frame, a three-frame low latency transaction 311 is started. In this example, the transaction 311 completes successfully, so that there is no need for a retry. Consequently, when the next scheduled time frame 313 is the current time frame, the sender (master) merely performs an action that can be completed within a single time frame. This leaves five time frames of wasted air time (i.e., three remaining time frames preallocated for use by the low latency data stream immediately followed by a two-frame guard space 301). It would certainly be beneficial to provide a way to utilize this air time for best effort traffic. In theory, the low latency sender could have started another three-frame transaction when time frame 313 is the current time frame. However, this is not depicted because it is often the case that low latency data is ready for transmission at known intervals, and the time frame 313 may be occurring too soon for a next low latency packet to be ready. Thus, there may simply be no low latency transaction that can be started at time frame 313.

Continuing with the example, a best effort transaction 317 is started when the time frame 319 (preallocated for use by best effort traffic) is the current time frame. The remainder of the example continues as described above.

FIG. 3c is an exemplary timing diagram illustrating time frame usage when one or two retransmissions are required in the low latency data stream. As before, a three-frame low latency transaction 321 begins when the time frame 309 is the current time frame. The transaction extends into the next two time frames, and here it is assumed that, at the conclusion of the transaction, the sender (master) receives acknowledgement information indicating that the packet was not successfully received by the receiver (slave). Consequently, the low latency sender uses its next preallocated time frame 313 to start a retransmission ("retry") 323 of the same transaction. This transaction 323 extends through the next two time frames. In this example, it is assumed that the first retry is successful, making a second retry unnecessary. Consequently, during the next time frame 325 that has been preallocated for use by the low latency data stream, the sender (master) merely performs a transaction 327 that can be completed within a single time frame. This leaves the time frames associated with the first guard space 301 unused, and therefore wasted.

The next time frame 319 is allocated for use by the best effort data stream, and as before, two best effort transactions 329, 331 take place before the low latency data stream has another opportunity to start a transaction.

The low latency data stream's next opportunity to start a transaction is during time frame 333. In this example, this transaction 335 is assumed to be a new transaction, and it is further assumed that the transaction 335 was unsuccessful, so that the transaction is retried 337 beginning in time frame 339. This first retry transaction 337 is also assumed to be unsuccessful, so that the sender (master) performs as second retry transaction 341 beginning at the next opportunity, which is preallocated time frame 343. Remaining illustrated transactions are performed in accordance with principles described and illustrated earlier.

For at least the foregoing reasons, it is desirable to have methods and apparatuses that make better use of available air time when prescheduling a mix of low latency/guaranteed latency and best effort transactions in a Bluetooth®-like communications environment. It is further desirable to achieve this prescheduling goal without substantially (if at all) increasing the scheduler's processing load.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for allocating time frames for performance of transactions of a low latency data stream and transactions of a best effort data stream in a communication equipment, wherein each transaction comprises transmission of a packet and receipt of status information indicating whether the transmission of the packet was successful. Payload carrying packets of the low latency data stream and of the best effort data stream are of the same size and each occupies a plurality of time frames. An "overrule" mechanism is employed, wherein transmission of any packet in the low latency data stream must begin in a frame that has been allocated for use by the low latency data stream but continues into successive time frames as needed to complete the transmission regardless of whether the successive time frames are allocated to the low latency data stream, and wherein transmission of any packet in the best effort data stream must begin in a frame that has been allocated for use by the best effort data stream but continues into successive time frames as needed to complete the transmission regardless of whether the successive time frames are allocated to the best effort data stream. The allocation strategy involves individually allocating every one of a plurality of time frames within a window of successive time frames for use by the low latency data stream or by the best effort data stream; and allocating a plurality of time frames immediately following the window of successive time frames for use as a guard space between the window of successive time frames and a next occurring window of successive time frames, wherein the time frames of the guard space are neither allocated for use by the low latency data stream nor by the best effort data stream. The window of successive time frames consists of an initial set of time frames first followed by an intermediate set of time frames and then by a final set of time frames. The initial set of time frames comprises a plurality of one or more initial groups of time frames that are all allocated for use by the low latency data stream, wherein each initial group of time frames consists of a minimum number of time frames required to perform one transaction involving a payload carrying packet of the low latency data stream. The intermediate set of time frames consists of a plurality of intermediate groups of time frames, wherein each intermediate group of time frames consists of an initial intermediate time frame allocated for use by the low latency data stream and followed by one or more other intermediate time frames allocated for use by the best effort data stream and numbering one less than the minimum number of time frames required to perform one transaction involving a payload carrying packet of the low latency data stream. The final set of time frames consists of one time frame allocated for use by the low latency data stream followed by one time frame allocated for use by the best effort data stream. The guard space comprises a number of time frames that is one less than the minimum number of time frames required to perform one transaction involving a payload carrying packet of the low latency data stream.

In an aspect of some but not necessarily all embodiments, the communication equipment is a Bluetooth® communication device, and each time frame consists of an even time slot and an immediately following odd time slot.

In an aspect of some but not necessarily all embodiments, the minimum number of time frames required to perform one transaction involving a payload carrying packet of the low latency data stream is two.

In an aspect of some but not necessarily all embodiments, the minimum number of time frames required to perform one transaction involving a payload carrying packet of the low latency data stream is three.

In an aspect of some but not necessarily all embodiments, the initial set of time frames consists of a plurality of time frames whose number is equal to the minimum number of frames required to perform one transaction involving a payload carrying packet of the low latency data stream.

In an aspect of some but not necessarily all embodiments, the low latency data stream is a guaranteed latency data stream.

BRIEF DESCRIPTION OF THE DRAWINGS

The objects and advantages of the invention will be understood by reading the following detailed description in conjunction with the drawings in which:

FIGS. 1a, 1b, and 1c illustrate packets that, in accordance with the Bluetooth® standards, are 1, 3, and 5 slots long, respectively.

DETAILED DESCRIPTION

Figure 2A:
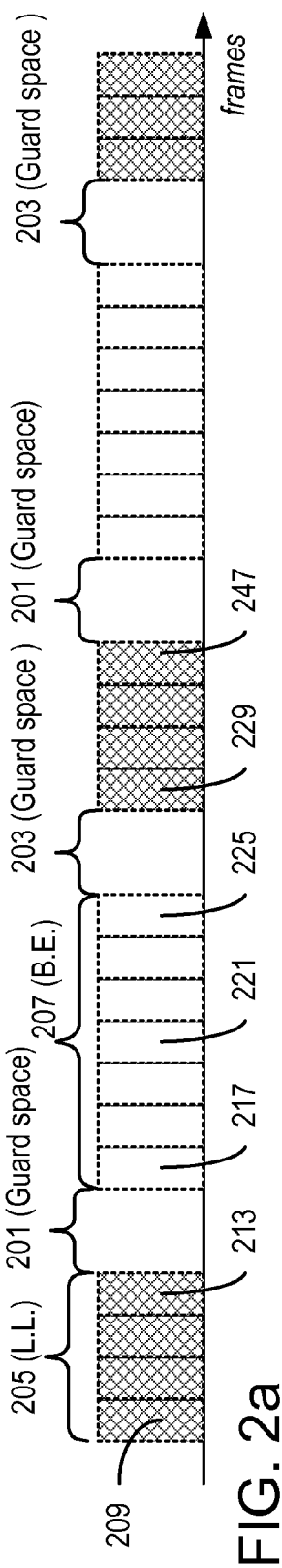
FIG. 2a is a timing diagram of a conventional prescheduling strategy for mixing low latency traffic with best effort traffic.
Figure 2B:
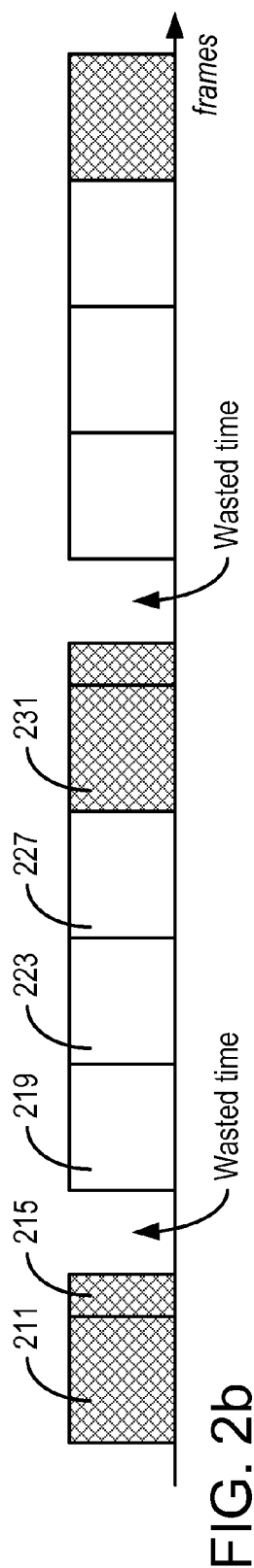
FIG. 2b is a timing diagram illustrating an example in which all transactions complete successfully on the first try, making retransmissions unnecessary.
Figure 2C:
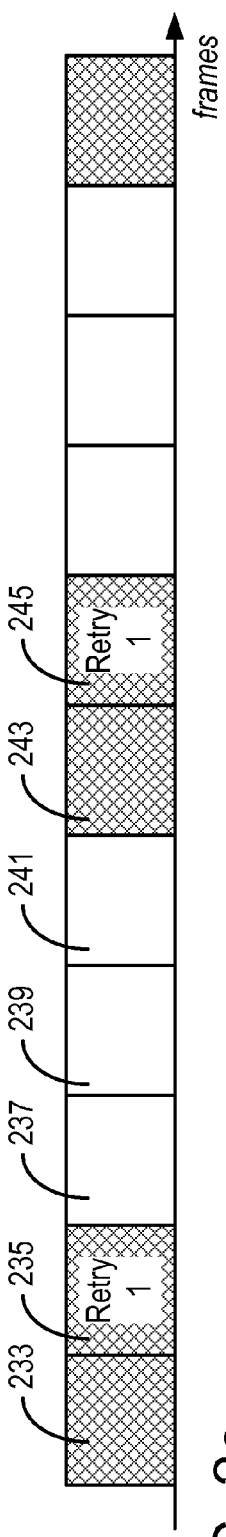
FIG. 2c is an exemplary timing diagram illustrating time frame usage when single retransmissions are required in the low latency data stream.
Figure 3A:
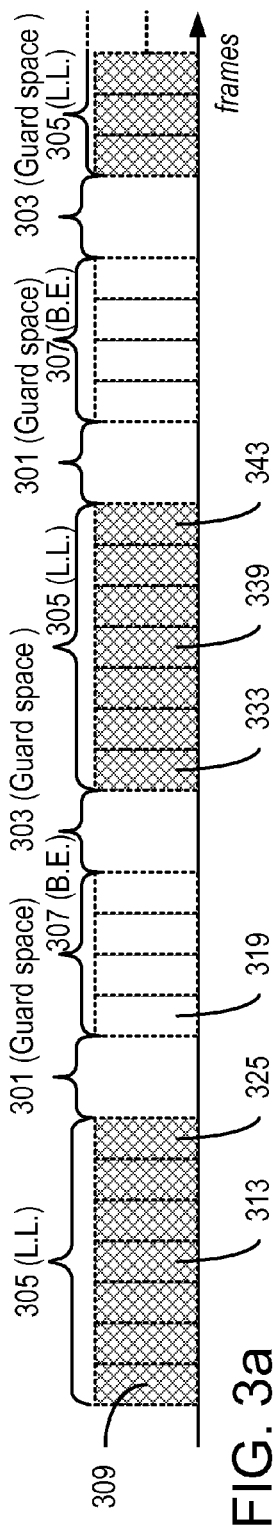
FIG. 3a depicts another timing diagram of a conventional prescheduling strategy for mixing low latency traffic with best effort traffic.
Figure 3B:
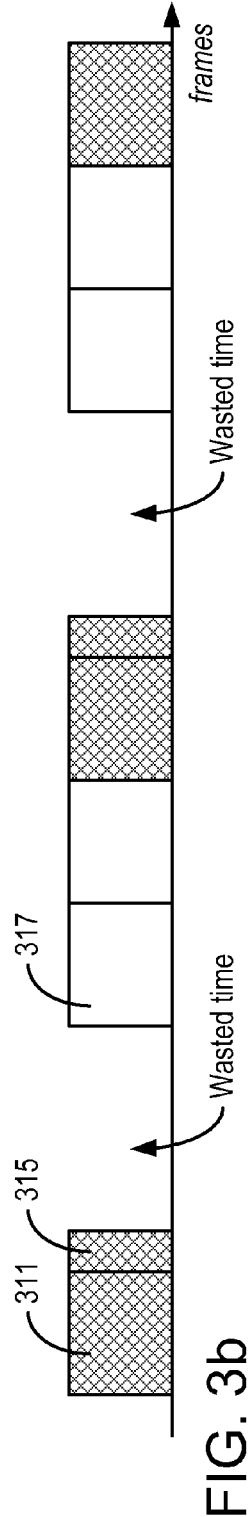
FIG. 3b is a timing diagram illustrating an example in which all transactions complete successfully on the first try, making retransmissions unnecessary.
Figure 3C:
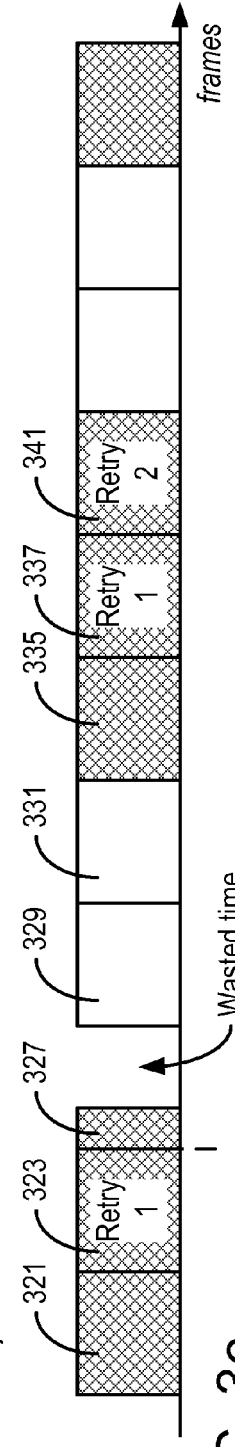
FIG. 3c is an exemplary timing diagram illustrating time frame usage when one or two retransmissions are required in the low latency data stream.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a prescheduling methodology is provided that relies on the use of an overrule mechanism (as described earlier) in conjunction with a particular approach to scheduling that guarantees that a low latency data stream will always have a chance to attempt a transmission at particular times, and if an attempted transmission fails, the approach further guarantees that the low latency data stream will have some determinable number of retransmission attempt opportunities without interruption by the best effort data stream. Furthermore, if the low latency data stream does not use all of the retransmission attempt opportunities, all but one of the frames allocated for those retransmission attempt opportunities can be used by the best effort data stream to begin and continue with transmission/retransmission of best effort packets.

It is possible to achieve one or more of the desired goals in embodiments that utilize a prescheduling architecture, and also in embodiments that utilize a real-time (dynamic) scheduling architecture. The discussion will first focus on aspects relating to those embodiments that utilize a prescheduling architecture.

One aspect of such embodiments is that transmissions for the best effort data stream are scheduled immediately after transmission opportunities of the low latency data stream. In this respect it is important to note that, due to the use of an overrule mechanism, a transmission opportunity is created merely by scheduling a single frame to one of the data streams even if performance of that data stream's transactions will require more than one frame. The sending device (source of the low latency data stream and of the best effort data stream) needs to be able to control the timing of each transmission, and thus, in accordance with Bluetooth®-like principles, must be master of both links (e.g., the sending device should handle the two links in the same Bluetooth®-like piconet).

In a prescheduling architecture that also separates prescheduling calculations from the data path activities, it is easy to reserve bandwidth for a link even if there is no data to transmit (at the time of calculating the preschedule). This allows reserving air-time (bandwidth) and scheduling air-time for the low latency service and for the best effort service simultaneously. In other words, best effort traffic and low latency traffic can be scheduled with the same periodicity, thus effectively making it possible to minimize unused air-time between distinct data transmissions of the different streams.

Because of the overrule mechanism, retransmissions of the low latency stream can take precedence over air-time prescheduled for the best effort stream. This is a desired feature of the various embodiments. Retransmissions for the best effort service type similarly risk overruling prescheduled activities for the low latency stream. At certain times this is desirable, and it is this aspect that enables the best effort data stream to make use of air-time that could otherwise be used by the low latency data stream's retransmissions. However, the low latency data stream must have certain time frames in which it is guaranteed that it can begin a data stream regardless of the best effort data stream's need for retransmissions. This can be achieved by the appropriate use of guard space, as will be described in greater detail below.

In another aspect of various embodiments, frames for the guaranteed (low) latency data stream are interspersed in-between frames scheduled for the best effort stream in a way that enables the overrule mechanism to provide an automatic extension of air-time for retransmitting guaranteed (low) latency data packets. When retransmission of low latency/guaranteed latency data packet is not needed, the frames that had been scheduled for use by the best effort data stream can in fact be used by the best effort data stream. It will be noted that it may sometimes be the case that the air-time scheduled for the best effort stream will not be utilized simply because no best effort data is available (i.e., when the data source hasn't made the data available in time).

The low latency data stream's frames should be interspersed every N+1 slots, depending on the size of the baseband packets used for the guaranteed (low) latency data stream, where N is the size of the baseband packets (e.g., 3 for xDH3 packets, or 5 for xDH5 packets). It will be noted that N is always odd. Another way of considering this aspect is that the low latency data streams frames should be interspersed among those allocated for the best effort data stream such that a low latency frame occurs with a periodicity equal to the number of frames required to complete one payload carrying transaction (where a payload extends into more than one frame).

A characteristic of this approach is that, in order to reap the benefits of optimizing the throughput (or bandwidth usage) of the best effort stream, all data packets (i.e., those for the low latency and those for the best effort data streams) must occupy the same number of time slots. Without this, the overrule mechanism will not "discard" frames in the desired way. This is not believed to be a harsh limitation, however, because usually all possible packet types are enabled (i.e., allowed to be used) on a link and the Bluetooth®-like controller can select/use packet types as it sees fit.

It is further recognized that any given implementation will not fail to operate simply because the packet size requirements are not fulfilled. In such cases, transactions will still be performed but these will occur without the benefits of maximizing the throughput of the best effort data stream. For example, if the best effort data stream's packets are smaller than those of the low latency data stream, then the best effort data stream's transactions will not always overrule a frame prescheduled for use by the low latency data stream, and this means that the low latency data stream will be given additional opportunities to begin transactions. However, the allocation windows are preferably configured based on the low latency data stream's requirements, so that these extra opportunities will potentially be more than what is needed. This in turn results in unused/lost air-time—lost air-time that could have been used for the best effort stream.

Another characteristic of this approach is that, in order to achieve the maximum benefits of the inventive arrangements, the size of the packets sent by the remote device (e.g., the slave device in a slave-to-master transmission) must be limited to single slot packets. This is needed in order to obtain a predictable traffic pattern on the air interface. Again, this is not a harsh limitation because the remote device is the receiving side in these types of links and does not need much bandwidth for conveying acknowledgements and/or some control- and protocol-packets. And, as stated above, failure to abide by this restriction does not result in an inoperative system—it merely comes at the expense of the potential maximized air-time usage.

Figure 4:
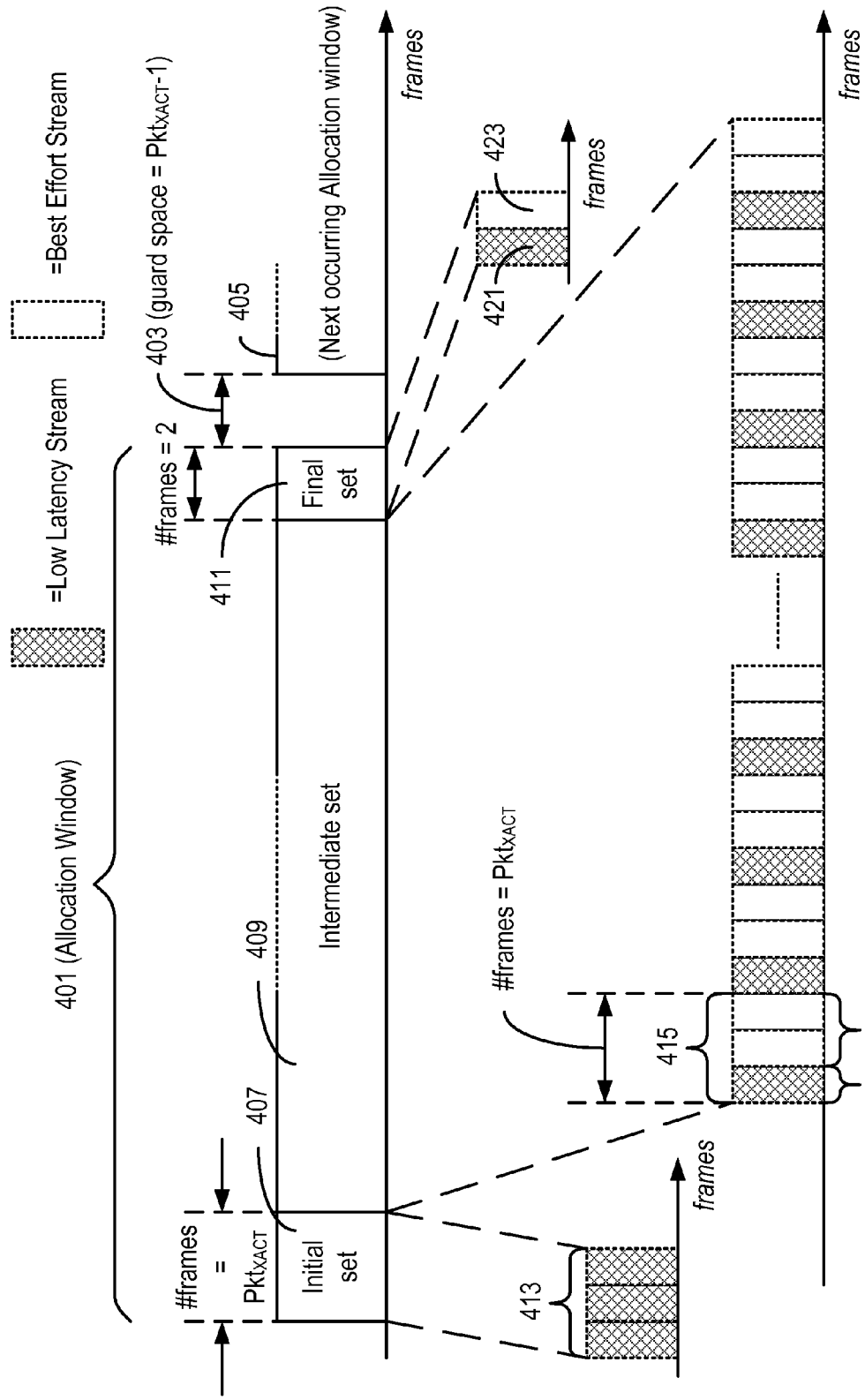
FIG. 4 is a timing diagram showing an exemplary embodiment of a prescheduling strategy that conforms with inventive principles.

FIG. 4 is a timing diagram showing an exemplary embodiment of a prescheduling strategy that conforms with inventive principles. In accordance with aspects consistent with the invention, prescheduling involves individually allocating every one of a plurality of time frames within a window of successive time frames (allocation window) 401 for use by the low latency data stream or by the best effort data stream. Additionally, a plurality of time frames immediately following the allocation window 401 is allocated for use as a guard space 403 between the window of successive time frames 401 and a next occurring window of successive time frames 405, wherein the time frames of the guard space 403 are neither allocated for use by the low latency data stream nor by the best effort data stream.

The allocation window 401 consists of three parts: an initial set 407, followed by an intermediate set 409, followed by a final set 411. These are described in detail in the following.

The initial set of time frames 407 comprises a plurality of one or more initial groups of time frames that are all allocated for use by the low latency data stream, wherein each initial group of time frames consists of a minimum number of time frames required to perform one transaction involving a payload carrying packet of the low latency data stream. In the example of FIG. 4, it is assumed that a single transaction spans 3 time frames, and that the initial set of time frames 407 has only a single initial group 413 of time frames. This initial set of time frames 407 guarantees that the low latency data stream will have as many opportunities to perform a payload carrying transaction as there are groups of time frames in the initial set 407.

The intermediate set of time frames 409 consists of a plurality of intermediate groups 415 of time frames, wherein each intermediate group 415 of time frames consists of an initial intermediate time frame 417 allocated for use by the low latency data stream and followed by one or more other intermediate time frames 419 allocated for use by the best effort data stream and numbering one less than the minimum number of time frames required to perform one transaction involving a payload carrying packet of the low latency data stream. This means that the number of frames in each intermediate group 415 of time frames consists of a number of time frames, $Pkt_{XACT}$, equal to the number of time frames required to perform one transaction involving a payload carrying packet of the low latency data stream. In the example of FIG. 4, a transaction involving a payload carrying packet is assumed to require 3 time frames. Therefore, in this example, the other intermediate time frames 419 consists of two time frames ($Pkt_{XACT}-1=3-1=2$), each allocated for use by the best effort data stream.

The final set of time frames 411 consists of one time frame 421 allocated for use by the low latency data stream followed by one time frame 423 allocated for use by the best effort data stream.

As mentioned above, the initial set 407 of time frames guarantees that the low latency data stream will have as many opportunities to perform a payload carrying transaction as there are groups of time frames in the initial set 407. Moreover, the arrangement of the intermediate set 409, with each intermediate group 415 starting with a single time frame 417 allocated for use by the low latency data stream, guarantees that immediately following the initial set 407, the low latency data stream will be guaranteed as many opportunities to begin a retry of the payload carrying transaction as it needs, up to the number of intermediate groups 415 within the intermediate set 409. The frames required to begin and complete each of these opportunities comes from the initial time frame 417 of each intermediate group 415, followed by the overrule mechanism's usurping of the other intermediate time frames 419.

It will further be appreciated that, as soon as the low latency data stream has no further immediate need to continue retrying the payload carrying transaction, the best effort data stream can begin its transactions very quickly. This comes about by virtue of the low latency data stream not beginning a payload carrying transaction in the next occurring initial time 417, so that the best effort data stream can begin a payload carrying transaction in the first one of the next occurring other intermediate time frames 419. The best effort payload carrying transaction that has been started then extends to completion through the remaining ones of the next occurring other intermediate time frames 419, followed by the overrule mechanism's usurping of the next occurring single time frame 417 allocated for use by the low latency data stream.

Assuming that the number of time frames in the intermediate set of time frames 409 have not all occurred, another best effort payload carrying transaction can be started because upon completing one best effort payload carrying transaction, the very next time frame will be a first one of the other intermediate time frames 419, which is by definition allocated for use by the best effort data stream.

As mentioned above, the final set of time frames 411 is configured with two time frames, namely, a first time frame 421 allocated for use by the low latency data stream followed by a second time frame 423 allocated for use by the best effort data stream. They function as follows: If the low latency stream's retries have worked their way through the entire intermediate set 409 of time frames, then the timing will be lined up to permit the low latency data stream to begin yet another retry of the payload carrying transaction in the first time frame 421 of the final set 411 of time frames, and to complete that transaction by the overrule mechanism's usurping the second time frame 423 of the finale set of time frames 411 as well as a first occurring time frame of the next occurring guard space 403. In such cases, there will remain one time frame of the guard space 403 left to separate this allocation window 401 from the next occurring allocation window 405.

If the low latency data stream's retries do not extend through the entirety of the intermediate set 409 of time frames, then the last best effort payload carrying transaction begun in the intermediate set 409 of time frames will extend (by means of the overrule mechanism) through the first time frame 421 of the final set of time frames 411. This timing leaves the best effort data stream in a position to begin yet another payload carrying transaction in the second time frame 423 of the final set of time frames 411. This payload carrying transaction will then extend through the entirety of the guard space 403.

Following the guard space 403 is the start of the next occurring allocation 405, which guarantees that the low latency data stream will have another opportunity to begin a payload carrying transaction regardless of whether the last performed payload transaction was associated with the low latency data stream or the best effort data stream.

Figure 5:
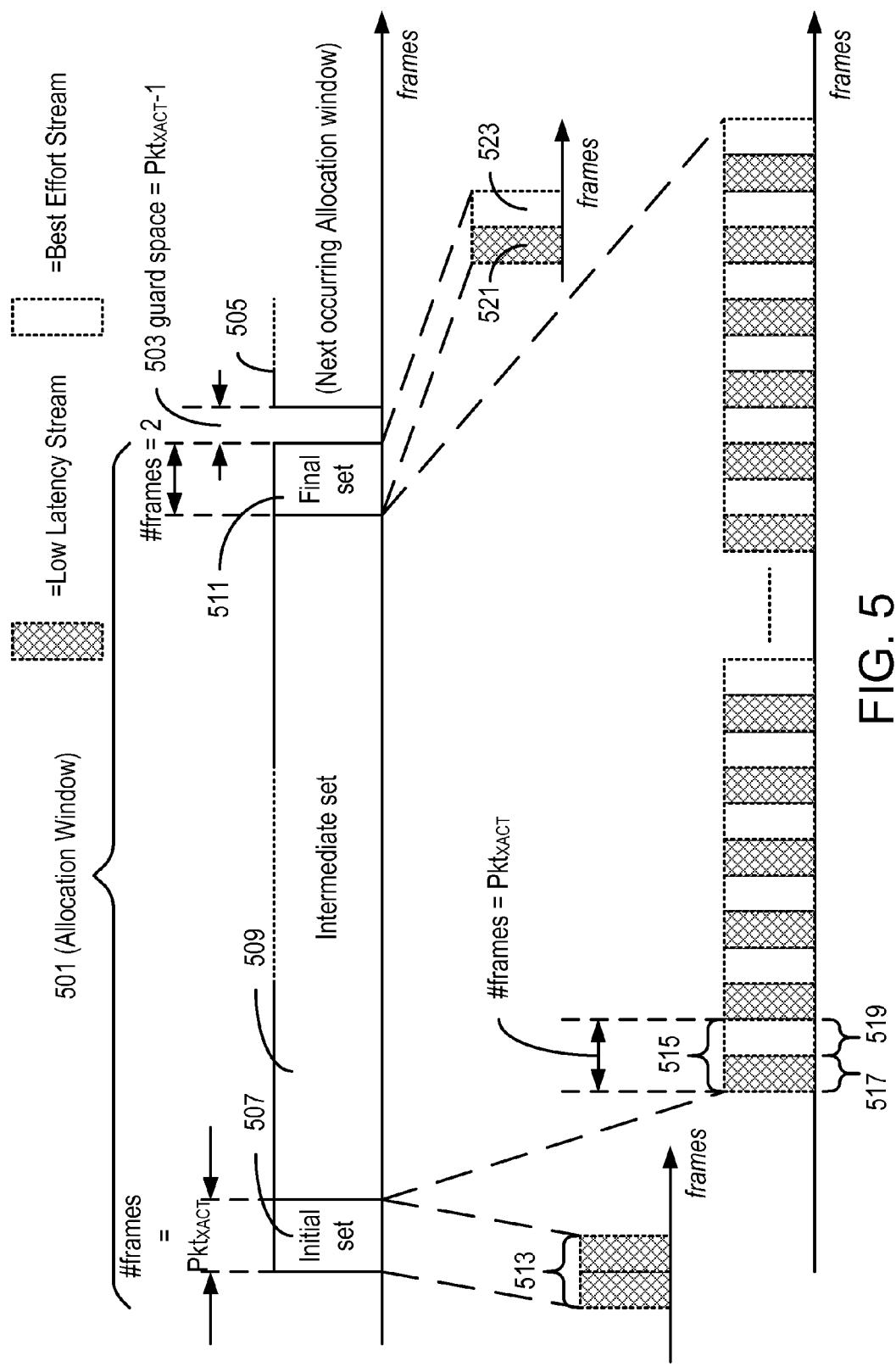
FIG. 5 depicts one alternative embodiment consistent with the inventive principles in which each payload carrying transaction occupies only two time frames instead of three.

The exemplary embodiment illustrated in FIG. 4 is based on the assumption that each payload carrying transaction occupies three time frames, but this is not a requirement in all embodiments. To the contrary, many alternative embodiments can be derived from the same principles described above, so long as payload carrying packets of the low latency data stream and of the best effort data stream are of the same size and each occupies a plurality of time frames. To illustrate this point, FIG. 5 depicts one alternative embodiment in which each payload carrying transaction occupies only two time frames instead of three. The arrangement and functioning of the allocation window 501 (and of course, other allocation windows such as the next occurring allocation window 505 that immediately follows a guard space 503) is the same as that of the allocation window 401 described with reference to FIG. 4, with the difference being that the arrangement of the allocation window 501 is based on needing two rather than three time frames for each payload carrying transaction. Accordingly, the guard space 503, whose size is one less than the size of a packet carrying transaction, occupies only a single frame. Similarly, the initial set 507 of time frames comprises an initial group 513 of time frames consisting of only two time frames, since this is all that is required for the low latency stream to perform one payload carrying transaction. Continuing, it can be seen that the intermediate set 509 of time frames consists of intermediate groups of time frames, such as the intermediate group 515 of time frames, each consisting of two time frames: an initial intermediate time frame 517 allocated for use by the low latency data stream, followed by one other intermediate time frame 519 allocated for use by the best effort data stream.

The intermediate set 509 of time frames is immediately followed (i.e., without any intervening time frames) by a final set 511 of time frames that consists of one time frame 521 allocated for use by the low latency data stream followed by one time frame 523 allocated for use by the best effort data stream.

The operation of the allocation window 501 is essentially the same as that which was described above with respect to the allocation window 401. Therefore, that description does not have to be repeated here.

Figure 6:
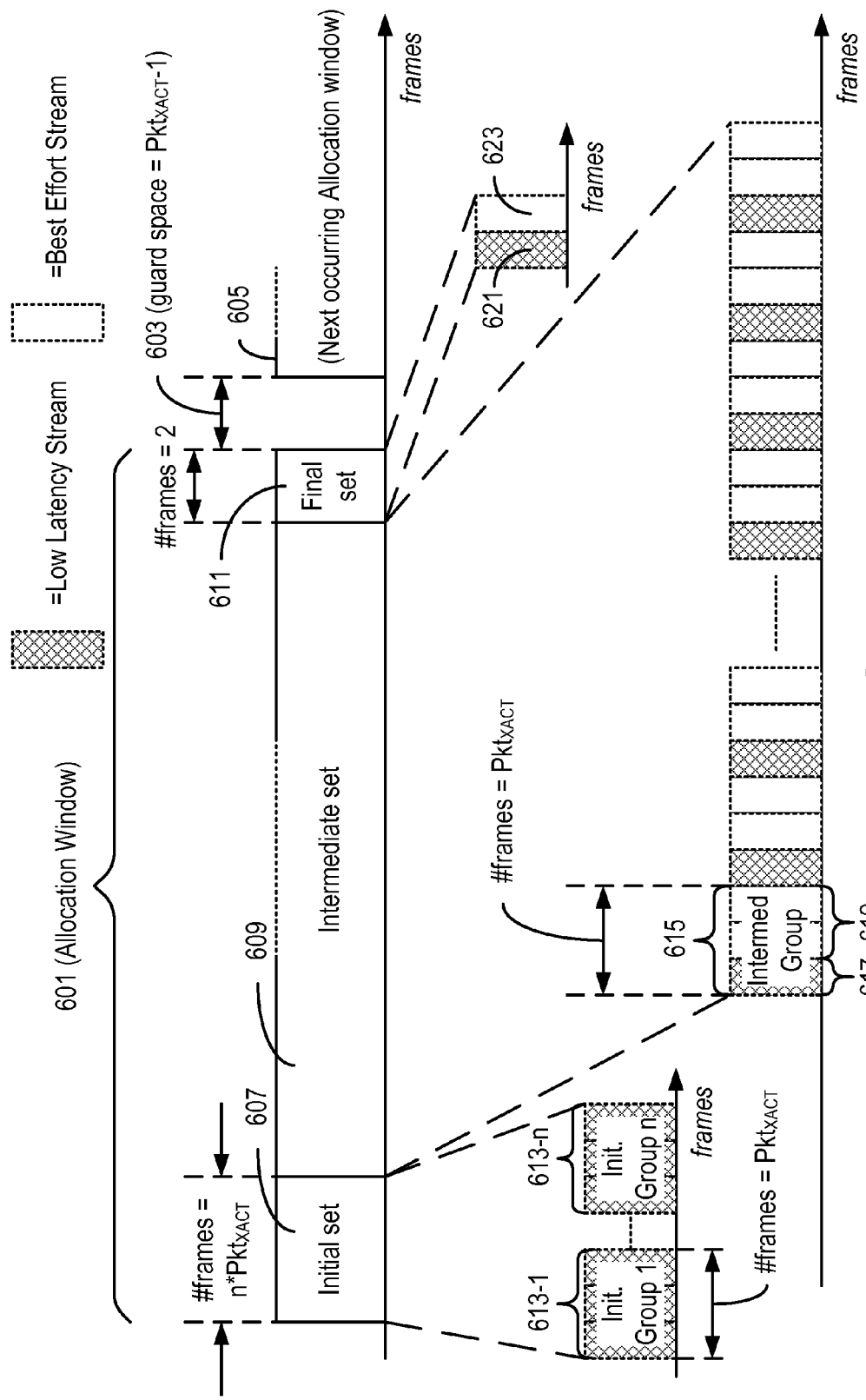
FIG. 6 depicts one alternative embodiment consistent with aspects of the invention in which each payload carrying transaction occupies three time frames, and in which it is assumed that it is desired to guarantee that the low latency data stream will have opportunities to begin several perhaps different payload carrying transactions without impinging on time frames allocated for use by the best effort data stream.

To further illustrate how alternative embodiments can be derived from the same principles described above, so long as payload carrying packets of the low latency data stream and of the best effort data stream are of the same size and each occupies a plurality of time frames, FIG. 6 is presented, which depicts one alternative embodiment in which each payload carrying transaction occupies three time frames, the same as was depicted in FIG. 4. However, in this embodiment, it is assumed that it is desired to guarantee that the low latency data stream will have opportunities to begin several perhaps different payload carrying transactions without impinging on time frames allocated for use by the best effort data stream. The arrangement and functioning of the allocation window 601 (and of course, other allocation windows such as the next occurring allocation window 605) is the same as that of the allocation window 401 described with reference to FIG. 4, with the difference being that the arrangement of the allocation window 601 provides more opportunities for the low latency data stream to begin payload carrying transactions during the initial set 607 of time frames. Accordingly, the guard space 605, whose size is one less than the size of a packet carrying transaction, occupies two time frames, the same as shown in FIG. 4.

Similarly, the initial set 607 of time frames comprises initial groups of time frames, such as the initial group 613-1 of time frames, each consisting of three time frames, since this is what is required for the low latency stream to perform one payload carrying transaction. It will be observed that in this embodiment, the initial set 607 of time frames consists of a number, n, of initial groups 613-1, . . . , 613-n of time frames, where n is greater than one. The n initial groups 613-1, . . . , 613-n of time frames follow one another without any intervening time frames, and thereby guarantee that the low latency data stream will have n opportunities to begin payload carrying transactions during the initial set 607 of time frames.

Continuing with the description of the allocation window 601, it can be seen that the intermediate set 609 of time frames consists of intermediate groups of time frames, such as the intermediate group 615 of time frames, each consisting of two time frames: an initial intermediate time frame 617 allocated for use by the low latency data stream, followed by two other intermediate time frames 619 allocated for use by the best effort data stream.

The intermediate set 609 of time frames is immediately followed (i.e., without any intervening time frames) by a final set 611 of time frames that consists of one time frame 621 allocated for use by the low latency data stream followed by one time frame 623 allocated for use by the best effort data stream.

The operation of the allocation window 601 is essentially the same as that which was described above with respect to the allocation window 601, with the difference being the additional guaranteed opportunities for the low latency data stream to begin payload carrying transactions during the initial set 607 of time frames. Therefore, that description does not have to be repeated here.

Figure 7:
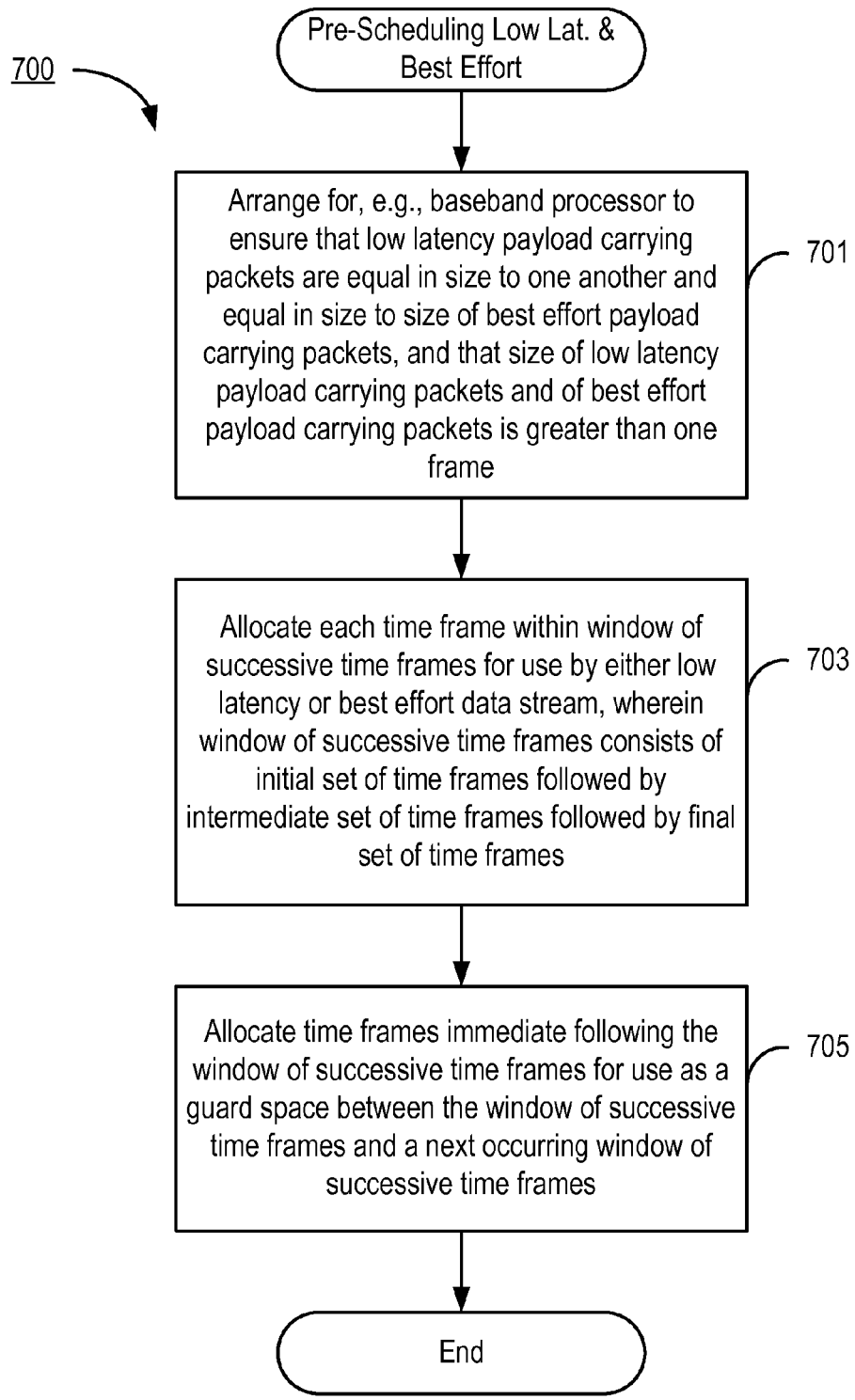
FIG. 7 is, in one respect, a flow chart of steps/processes performed by a primary apparatus in accordance with some but not necessarily all exemplary embodiments of the invention.

To further illustrate aspects of embodiments consistent with exemplary embodiments of the invention, FIG. 7 is, in one respect, a flow chart of steps/processes performed by a primary apparatus in accordance with some but not necessarily all exemplary embodiments of the invention. In another respect, FIG. 7 can be considered to depict exemplary means 700 comprising the various illustrated circuitry (e.g., hard-wired and/or suitably programmed processor) configured to perform the described functions.

In this exemplary embodiment, pre-scheduling time frames for shared use by low latency and best effort data streams includes arranging for communication circuitry (e.g., a baseband processor) to ensure that low latency payload carrying packets are equal in size to one another and equal in size to the size of best effort payload carrying packets, and also that the size of low latency payload carrying packets and of best effort payload carrying packets is greater than one frame (step 701).

In another aspect, an allocation window (e.g., such as but not limited to the allocation windows 401, 501, 601 described above) is created. This involves allocating each time frame within a window of successive time frames for use by either the low latency data stream or the best effort data stream, wherein the window of successive time frames consists of an initial set 407, 507, 607 of time frames followed by an intermediate set 409, 509, 609 of time frames followed by a final set 411, 511, 611 of time frames (step 703).

Yet another aspect of embodiments consistent with the invention involves allocating time frames immediate following the window of successive time frames (e.g., allocation window 401, 501, 601) for use as a guard space 403, 503, 603 between the window of successive time frames (e.g., allocation window 401, 501, 601) and a next occurring window of successive time frames (e.g., next occurring allocation window 405, 505, 605) (step 705).

Figure 8:
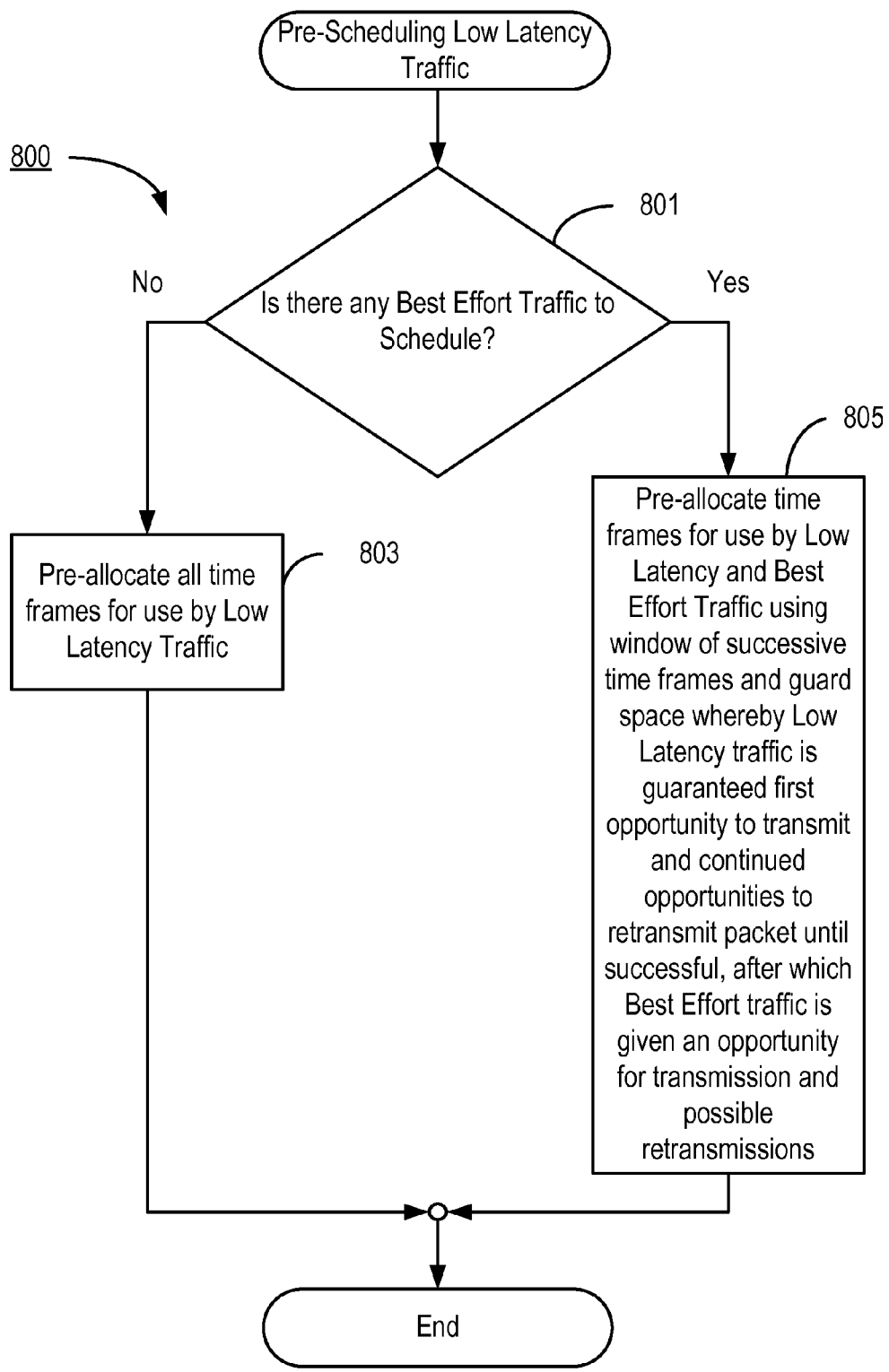
FIG. 8 is, in one respect, a flow chart of steps/processes performed by a primary apparatus in accordance with some but not necessarily all exemplary embodiments of the invention.

To further illustrate aspects of embodiments consistent with exemplary embodiments of the invention, FIG. 8 is, in one respect, a flow chart of steps/processes performed by a primary apparatus in accordance with some but not necessarily all exemplary embodiments of the invention. In another respect, FIG. 8 can be considered to depict exemplary means 800 comprising the various illustrated circuitry (e.g., hard-wired and/or suitably programmed processor) configured to perform the described functions.

In this exemplary embodiment, pre-scheduling time frames for shared use by low latency and best effort data streams includes the pre-scheduler circuitry first ascertaining whether there is any best effort traffic to schedule (decision block 801). If there isn't any ("NO" path out of decision block 801), then there is no need to take any special action to ensure sharing, and the pre-scheduler circuitry simply pre-allocates all time frames for use by the low latency data stream (step 803).

However, if it is ascertained that there is best effort traffic to schedule ("YES" path out of decision block 801), then the prescheduler circuitry pre-allocates time frames for use by the low latency and best effort data streams ("traffic") using a window of successive time frames (e.g., an allocation window 401, 501, 601) and a guard space (e.g., a guard space 403, 503, 603) whereby the low latency data stream is guaranteed a first opportunity to transmit a payload carrying packet and is further guaranteed continued opportunities to retransmit the packet until successful, after which the best effort traffic is given an opportunity for transmission and possible retransmissions (step 805).

Figure 9:
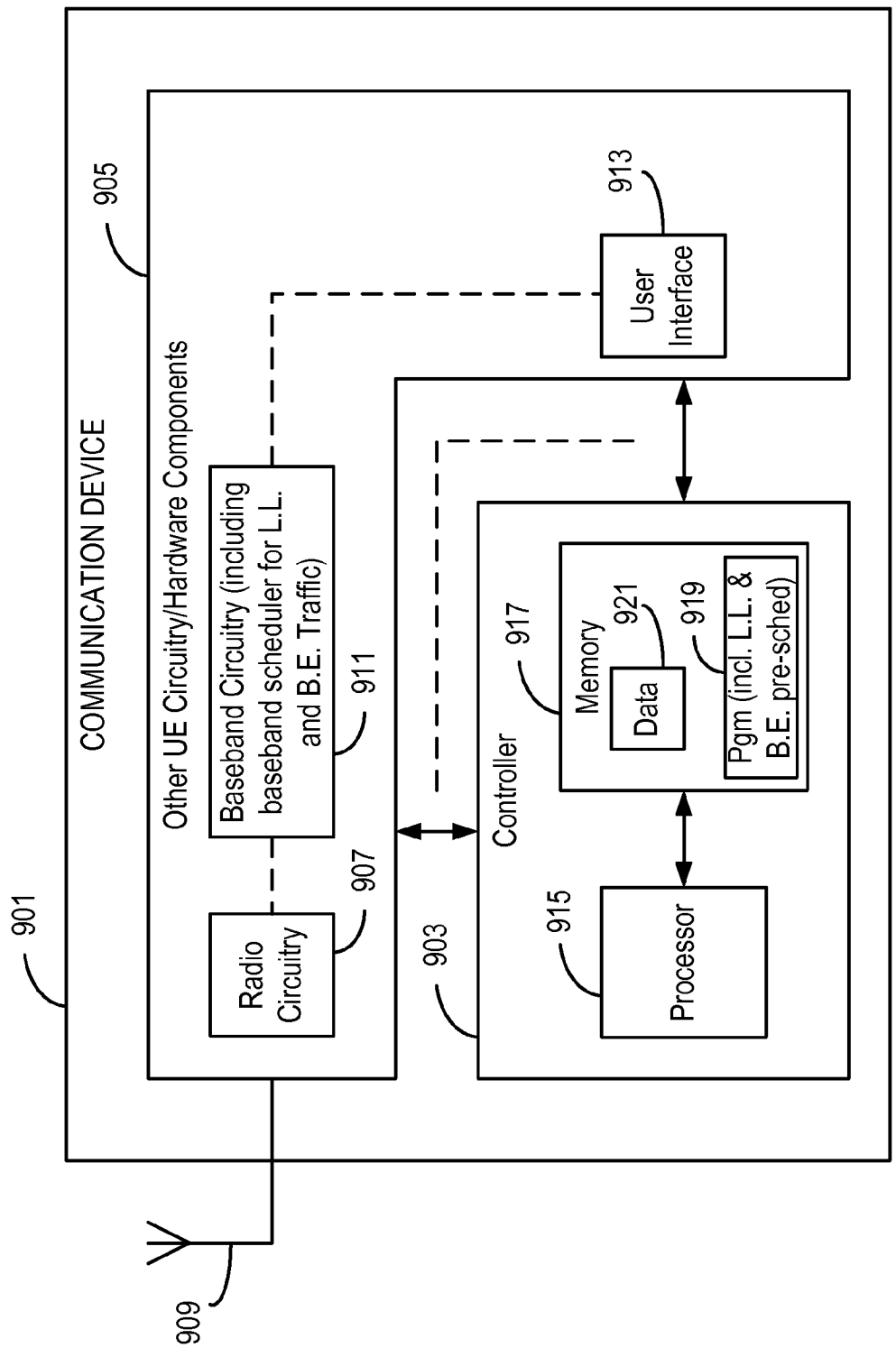
FIG. 9 is a block diagram of an exemplary communication device (e.g., a user equipment in a cellular communications system) configured to carry out aspects of the invention as described herein.

FIG. 9 is a block diagram of an exemplary communication device 901 (e.g., a user equipment in a cellular communications system) configured to carry out aspects of the invention as described above. The communication device 901 includes a controller 903 coupled to other User Equipment (UE) circuitry/hardware components 905 that enable the communication device 901 to perform whatever application-specific functionality it may be capable of (e.g., web browsing) and also to operate as a communication device. The other UE circuitry/hardware components 905 are generally known in the art, and may include such elements as, for example and without limitation, radio circuitry 907 coupled to one or more antennas 909, and baseband circuitry 911 (e.g., including a baseband scheduler for low latency and best effort data streams). The other UE circuitry/hardware may also include some sort of user interface (e.g., display, keyboard, touch screen, switch(es)) 913.

The controller 903 includes circuitry configured to carry out any one or any combination of the scheduler aspects described above with reference to any of FIGS. 4, 5, and 6. Such circuitry could, for example, be entirely hard-wired circuitry (e.g., one or more ASICs). Depicted in the exemplary embodiment of FIG. 9, however, is programmable circuitry, comprising a processor 915 coupled to one or more memory devices 917 (e.g., Random Access Memory, Magnetic Disc Drives, Optical Disk Drives, Read Only Memory, etc.). The memory device(s) store program means 919 (e.g., a set of processor instructions) configured to cause the processor 915 to control the other UE circuitry/hardware components 905 so as to carry out any of scheduling aspects described above such as, but not limited to, processes such as those illustrated by FIGS. 7 and/or 8. The memory 917 may also store data 921 representing various constant and variable parameters as may be needed by the processor 915 when carrying out its functions such as those specified by the program means 919.

Figure 10:
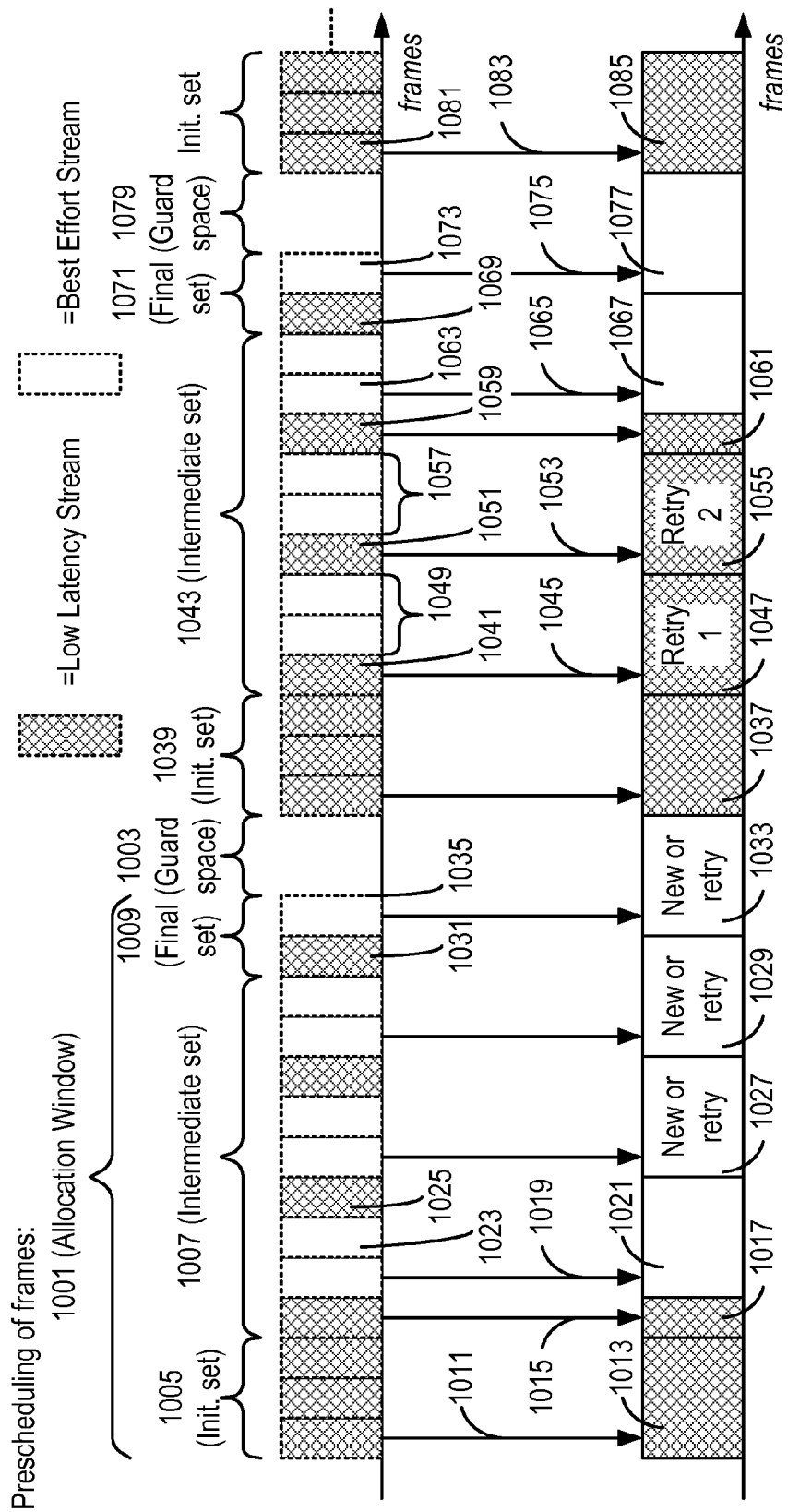
FIG. 10 is a timing diagram illustrating exemplary time frame usage that is possible based on an exemplary allocation window configuration in accordance with inventive aspects.

To further illustrate aspects of embodiments consistent with the invention, exemplary time frame usage that is possible based on an exemplary allocation window configuration is depicted in FIG. 10. The top part of the figure depicts an exemplary allocation window 1001 followed by a guard space 1003. This pattern is assumed to be repeated in time for some number of instances.

The allocation window 1001 consists of an initial set 1005 of time frames followed without any other intervening time frames by an intermediate set 1007 of time frames, and this is followed without any other intervening time frames by a final set 1009 of time frames.

In this example, the initial set 1005 of time frames consists of exactly three time frames allocated for use by the low latency data stream. Further, the exemplary intermediate set 1007 of time frames is made up of groups, each group comprising three time frames (i.e., a first intermediate time frame allocated for use by the low latency data stream followed by other intermediate time frames allocated for use by the best effort data stream—see FIG. 4 and its description for more details). In this example, the intermediate set 1007 consists of three such intermediate groups of time frames.

Also in this example, the final set 1009 of time frames consists of exactly two time frames, the first being allocated for use by the low latency data stream and the best being allocated for use by the best effort data stream. The guard space 1003 in this example also occupies two contiguous time frames.

Now, to see how the exemplary allocation window 1001 offers scheduling flexibility, assume that the baseband scheduler responds to the start of the allocation window having pre-allocated a time frame for use by the low latency data stream by beginning 1011 a first payload carrying transaction 1013 for the low latency data stream. Performance of the transaction 1013 requires three time frames, which uses up the full extent of the initial set 1005 of time frames.

The next time frame is the one occurring at the very start of the intermediate set 1007 of time frames, and in accordance with inventive principles described earlier, this time frame has been pre-allocated for use by the low latency data stream. In this example it is assumed that the initial transaction 1013 was successful, so that the baseband processor responds 1015 to the pre-allocation by allowing a low latency communication 1017 requiring only a single time frame to be performed (e.g., a polling operation and/or transmission of acknowledgement information to a slave device).

Following the transaction 1017, the next time frame is allocated for use by the best effort data stream, so the baseband processor responds 1019 by allowing a best effort payload carrying transaction 1021 for the best effort data stream to begin. Performance of the transaction 1021 requires three time frames, which uses up the next allocated time frame 1023 and then, by means of the overrule mechanism, also uses the next time frame 1025 that had been allocated for use by the low latency data stream.

The pattern involving the best effort data stream then repeats with a first new or retry best effort payload carrying transaction 1027 followed by a second new or retry best effort payload carrying transaction 1029. It can be seen that the second new or retry best effort payload carrying transaction 1029 extends into the first time frame 1031 of the final set 1009 of time frames, so that the best effort data stream is able to start yet another payload carrying transaction 1033, this one beginning in the second time frame 1035 of the final set 1009 of time frames, and extending through the entirety of the guard space 1003.

This brings us to the start of a second allocation window that is configured the same as the allocation window 1001 described above. Accordingly, the low latency data stream begins and completes a payload carrying transaction 1037 during the initial set 1039 of time frames. In this example it is now assumed that the low latency data stream's payload carrying transaction 1037 did not complete successfully, thereby requiring a retransmission.

The first time frame 1041 of the intermediate set 1043 of time frames is allocated for use by the low latency data stream, so the baseband control responds 1045 to this allocation by beginning a first retry transaction 1047. This first retry extends through the two time frames 1049 that were allocated for use by the best effort data stream.

The next allocated time frame 1051 is also allocated for use by the low latency data stream, and in this example it is assumed that the first retry transaction 1047 was also not successful. Accordingly, the baseband controller responds 1053 to the allocated time frame 1051 by starting a second retry transaction 1055 of the low latency data stream. The second retry transaction extends through the two time frames 1057 that were allocated for use by the best effort data stream.

It is now assumed that the second retry transaction 1055 was successful, so that the low latency data stream does not use the very next time frame 1059 (which is allocated for use by the low latency data stream) for any transaction that will require more than one time frame. Here, a single-time frame transaction 1061 is shown occurring in that single time frame.

The very next time frame 1063 is allocated for use by the best effort data stream, so the baseband controller responds 1065 to this allocation by beginning a best effort payload carrying transaction 1067 which extends through the last time frame of the intermediate set 1043 of time frames and into (by means of the overrule mechanism) the first time frame 1069 of the final set 1071 of time frames.

The next allocated time frame is the second time frame 1073 of the final set 1071 of time frames, which is always allocated for use by the best effort data stream. Accordingly, the baseband processor responds 1075 to this allocation by starting a best effort payload carrying transaction 1077, which extends through the entirety of the guard space 1079.

This brings us to the start of yet another allocation window whose first time frame 1081 is allocated for use by the low latency data stream. Accordingly, the baseband processor responds 1083 to this allocation by starting another low latency payload carrying transaction 1085.

The above-described embodiments were written from the point of view of implementations that utilized a pre-scheduler to pre-allocate the allocation windows, which are then consulted by the baseband processor when making real-time packet scheduling decisions (although strict adherence to these allocation windows is not followed whenever the overrule mechanism is invoked). However, another class of embodiments does not employ a pre-scheduler, but instead utilizes a real-time scheduler. In such embodiments, best effort payload carrying transactions are scheduled after finalizing a low latency transmission. In the event that no best effort data is available when a low latency transaction is finished, transmissions can be started later, taking care not to preempt or to increase latency for the low latency transactions.

The above described aspects is advantageous over conventional scheduling techniques. It brings an optimal throughput for the best effort data stream without detrimentally affecting the low latency data stream. In a conventional prescheduling implementation, guard frames would be scheduled between the two traffic types, as illustrated earlier, and time for retransmissions would be scheduled explicitly, thereby leading to unused (lost) air time most of the time (since retransmissions are not always needed).

The various aspects described above can easily be implemented in pre-scheduling architectures. These aspects do not increase the scheduling (processing) load (since it does not bring additional real-time decision points to be handled by software) and does not require changes to the baseband controller hardware (unless hardware embodiments are contemplated).

For real-time scheduling architectures, the various aspects can be applied by require special care when best effort transmissions cannot be scheduled immediately after low latency transmissions. Intrinsically, real-time scheduling architectures bring with them more stringent real time processing requirements.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of allocating time frames for performance of transactions of a low latency data stream and transactions of a best effort data stream in a communication equipment, wherein each transaction comprises transmission of a packet and receipt of status information indicating whether the transmission of the packet was successful, wherein payload carrying packets of the low latency data stream and of the best effort data stream are of the same size and each occupies a plurality of time frames, and wherein transmission of any packet in the low latency data stream must begin in a frame that has been allocated for use by the low latency data stream but continues into successive time frames as needed to complete the transmission regardless of whether the successive time frames are allocated to the low latency data stream, and wherein transmission of any packet in the best effort data stream must begin in a frame that has been allocated for use by the best effort data stream but continues into successive time frames as needed to complete the transmission regardless of whether the successive time frames are allocated to the best effort data stream, the method comprising:

individually allocating every one of a plurality of time frames within a window of successive time frames for use by the low latency data stream or by the best effort data stream; and allocating a plurality of time frames immediately following the window of successive time frames for use as a guard space between the window of successive time frames and a next occurring window of successive time frames, wherein the time frames of the guard space are neither allocated for use by the low latency data stream nor by the best effort data stream, wherein:

the window of successive time frames consists of an initial set of time frames first followed by an intermediate set of time frames and then by a final set of time frames, wherein:

the initial set of time frames comprises a plurality of one or more initial groups of time frames that are all allocated for use by the low latency data stream, wherein each initial group of time frames consists of a minimum number of time frames required to perform one transaction involving a payload carrying packet of the low latency data stream;

the intermediate set of time frames consists of a plurality of intermediate groups of time frames, wherein each intermediate group of time frames consists of an initial intermediate time frame allocated for use by the low latency data stream and followed by one or more other intermediate time frames allocated for use by the best effort data stream and numbering one less than the minimum number of time frames required to perform one transaction involving a payload carrying packet of the low latency data stream; and the final set of time frames consists of one time frame allocated for use by the low latency data stream followed by one time frame allocated for use by the best effort data stream; and the guard space comprises a number of time frames that is one less than the minimum number of time frames required to perform one transaction involving a payload carrying packet of the low latency data stream.

2. The method of claim 1, wherein:
the communication equipment is a short-range wireless communication device that operates in accordance with an ad hoc networking protocol, and each time frame consists of an even time slot and an immediately following odd time slot.

3. The method of claim 1, wherein the minimum number of time frames required to perform one transaction involving a payload carrying packet of the low latency data stream is two.

4. The method of claim 1, wherein the minimum number of time frames required to perform one transaction involving a payload carrying packet of the low latency data stream is three.

5. The method of claim 1, wherein the initial set of time frames consists of a plurality of time frames whose number is equal to the minimum number of frames required to perform one transaction involving a payload carrying packet of the low latency data stream.

6. The method of claim 1, wherein the low latency data stream is a guaranteed latency data stream.

7. An apparatus for allocating time frames for performance of transactions of a low latency data stream and transactions of a best effort data stream in a communication equipment, wherein each transaction comprises transmission of a packet and receipt of status information indicating whether the transmission of the packet was successful, wherein payload carrying packets of the low latency data stream and of the best effort data stream are of the same size and each occupies a plurality of time frames, and wherein transmission of any packet in the low latency data stream must begin in a frame that has been allocated for use by the low latency data stream but continues into successive time frames as needed to complete the transmission regardless of whether the successive time frames are allocated to the low latency data stream, and wherein transmission of any packet in the best effort data stream must begin in a frame that has been allocated for use by the best effort data stream but continues into successive time frames as needed to complete the transmission regardless of whether the successive time frames are allocated to the best effort data stream, the method comprising:

circuitry configured to individually allocate every one of a plurality of time frames within a window of successive time frames for use by the low latency data stream or by the best effort data stream; and circuitry configured to allocate a plurality of time frames immediately following the window of successive time frames for use as a guard space between the window of successive time frames and a next occurring window of successive time frames, wherein the time frames of the guard space are neither allocated for use by the low latency data stream nor by the best effort data stream, wherein:

the window of successive time frames consists of an initial set of time frames first followed by an intermediate set of time frames and then by a final set of time frames, wherein:

the initial set of time frames comprises a plurality of one or more initial groups of time frames that are all allocated for use by the low latency data stream, wherein each initial group of time frames consists of a minimum number of time frames required to perform one transaction involving a payload carrying packet of the low latency data stream;

the intermediate set of time frames consists of a plurality of intermediate groups of time frames, wherein each intermediate group of time frames consists of an initial intermediate time frame allocated for use by the low latency data stream and followed by one or more other intermediate time frames allocated for use by the best effort data stream and numbering one less than the minimum number of time frames required to perform one transaction involving a payload carrying packet of the low latency data stream; and the final set of time frames consists of one time frame allocated for use by the low latency data stream followed by one time frame allocated for use by the best effort data stream; and the guard space comprises a number of time frames that is one less than the minimum number of time frames required to perform one transaction involving a payload carrying packet of the low latency data stream.

8. The apparatus of claim 7, wherein:

the communication equipment is a short-range wireless communication device that operates in accordance with an ad hoc networking protocol, and each time frame consists of an even time slot and an immediately following odd time slot.

9. The apparatus of claim 7, wherein the minimum number of time frames required to perform one transaction involving a payload carrying packet of the low latency data stream is two.

10. The apparatus of claim 7, wherein the minimum number of time frames required to perform one transaction involving a payload carrying packet of the low latency data stream is three.

11. The apparatus of claim 7, wherein the initial set of time frames consists of a plurality of time frames whose number is equal to the minimum number of frames required to perform one transaction involving a payload carrying packet of the low latency data stream.

12. The apparatus of claim 7, wherein the low latency data stream is a guaranteed latency data stream.

13. A nontransitory processor readable storage medium having stored thereon program instructions that, when executed by a processor, cause the processor to perform a method of allocating time frames for performance of transactions of a low latency data stream and transactions of a best effort data stream in a communication equipment, wherein each transaction comprises transmission of a packet and receipt of status information indicating whether the transmission of the packet was successful, wherein payload carrying packets of the low latency data stream and of the best effort data stream are of the same size and each occupies a plurality of time frames, and wherein transmission of any packet in the low latency data stream must begin in a frame that has been allocated for use by the low latency data stream but continues into successive time frames as needed to complete the transmission regardless of whether the successive time frames are allocated to the low latency data stream, and wherein transmission of any packet in the best effort data stream must begin in a frame that has been allocated for use by the best effort data stream but continues into successive time frames as needed to complete the transmission regardless of whether the successive time frames are allocated to the best effort data stream, the method comprising:

individually allocating every one of a plurality of time frames within a window of successive time frames for use by the low latency data stream or by the best effort data stream; and allocating a plurality of time frames immediately following the window of successive time frames for use as a guard space between the window of successive time frames and a next occurring window of successive time frames, wherein the time frames of the guard space are neither allocated for use by the low latency data stream nor by the best effort data stream, wherein:

the window of successive time frames consists of an initial set of time frames first followed by an intermediate set of time frames and then by a final set of time frames, wherein:

the initial set of time frames comprises a plurality of one or more initial groups of time frames that are all allocated for use by the low latency data stream, wherein each initial group of time frames consists of a minimum number of time frames required to perform one transaction involving a payload carrying packet of the low latency data stream;

the intermediate set of time frames consists of a plurality of intermediate groups of time frames, wherein each intermediate group of time frames consists of an initial intermediate time frame allocated for use by the low latency data stream and followed by one or more other intermediate time frames allocated for use by the best effort data stream and numbering one less than the minimum number of time frames required to perform one transaction involving a payload carrying packet of the low latency data stream; and the final set of time frames consists of one time frame allocated for use by the low latency data stream followed by one time frame allocated for use by the best effort data stream; and the guard space comprises a number of time frames that is one less than the minimum number of time frames required to perform one transaction involving a payload carrying packet of the low latency data stream.

\* \* \* \* \*